United States Patent
Christmas et al.

(10) Patent No.: US 9,495,881 B2
(45) Date of Patent: Nov. 15, 2016

(54) SYSTEM AND METHOD FOR DISPLAYING MULTIPLE APPLICATIONS

(71) Applicant: Edsense, L.L.C., Superior, WI (US)

(72) Inventors: Coy Christmas, Superior, WI (US); Luke Malpass, Stoke-on-Trent (GB); Parnell Lutz, Duluth, MN (US)

(73) Assignee: Edsense, L.L.C., Superior, WI (US)

( * ) Notice: Subject to any disclaimer, the term of this patent is extended or adjusted under 35 U.S.C. 154(b) by 136 days.

(21) Appl. No.: 14/092,165

(22) Filed: Nov. 27, 2013

(65) Prior Publication Data
US 2015/0050633 A1     Feb. 19, 2015

Related U.S. Application Data

(60) Provisional application No. 61/731,399, filed on Nov. 29, 2012.

(51) Int. Cl.
*G06F 3/048* (2013.01)
*G09B 5/02* (2006.01)
(Continued)

(52) U.S. Cl.
CPC ............... *G09B 5/02* (2013.01); *G06F 3/048* (2013.01); *G06F 3/0484* (2013.01); *G06F 3/14* (2013.01); *G09G 5/14* (2013.01); *G09G 2354/00* (2013.01)

(58) Field of Classification Search
CPC .................... G09B 5/00; G09B 5/14; G06F 3/048–3/0486
See application file for complete search history.

(56) References Cited

U.S. PATENT DOCUMENTS 6,008,809 A * 12/1999 Brooks ............... G06F 3/0481
                                                    715/792
8,405,502 B2    3/2013 Teague
(Continued)

FOREIGN PATENT DOCUMENTS

CN          103546181 A      1/2014
EP          1168769 A2       2/2002
(Continued)

OTHER PUBLICATIONS

"Application Programming Interface" by David Orenstein, published Jan. 10, 2000 on Computerworld.com.*
(Continued)

*Primary Examiner* — Tuyetlien T Tran
*Assistant Examiner* — Patrick Ramsey
(74) *Attorney, Agent, or Firm* — J. Damon Ashcraft; Snell & Wilmer L.L.P.

(57) ABSTRACT

Systems, methods, and computer program products for displaying multiple applications on a graphical user interface ("GUI") are provided. An application control system ("ACS") may determine which applications should be displayed, and ACS may determine an optimal layout for the application on the GUI. ACS may move and/or resize the applications and automatically determine an optimal layout such that the applications substantially fill a portion of the GUI. Additionally, ACS may facilitate communication between the applications using an application programming interface ("API"). An application may obtain information from any other application on the GUI by transmitting requests via the API.

13 Claims, 13 Drawing Sheets

(51) Int. Cl.
*G06F 3/14* (2006.01)
*G09G 5/14* (2006.01)
*G06F 3/0484* (2013.01)

(56) References Cited

U.S. PATENT DOCUMENTS

| | | | |
|---|---|---|---|
| 2002/0138543 A1* | 9/2002 | Teng | G06F 21/41 718/102 |
| 2003/0217097 A1* | 11/2003 | Eitel | H04L 29/06 709/202 |
| 2005/0237704 A1 | 10/2005 | Ceresoli | |
| 2006/0057960 A1 | 3/2006 | Tran | |
| 2006/0085741 A1* | 4/2006 | Weiner | G06F 17/30893 715/246 |
| 2006/0200518 A1 | 9/2006 | Sinclair et al. | |
| 2006/0239275 A1 | 10/2006 | Zlateff et al. | |
| 2007/0050778 A1* | 3/2007 | Lee | H04N 5/44591 718/107 |
| 2007/0120846 A1 | 5/2007 | Ok et al. | |
| 2007/0130541 A1* | 6/2007 | Louch | G06F 3/04817 715/804 |
| 2007/0279852 A1 | 12/2007 | Daniel et al. | |
| 2008/0024976 A1 | 1/2008 | Hardson et al. | |
| 2008/0222238 A1 | 9/2008 | Ivanov et al. | |
| 2008/0223890 A1 | 9/2008 | Tecchiolli et al. | |
| 2008/0241809 A1* | 10/2008 | Ashmore | G09B 5/00 434/307 R |
| 2009/0144653 A1* | 6/2009 | Ubillos | G06F 3/0483 715/800 |
| 2010/0088634 A1* | 4/2010 | Tsuruta | G06F 3/0488 715/800 |
| 2010/0122207 A1 | 5/2010 | Kim et al. | |
| 2010/0238089 A1 | 9/2010 | Massand | |
| 2010/0309228 A1 | 12/2010 | Mattos et al. | |
| 2010/0315417 A1 | 12/2010 | Cho et al. | |
| 2011/0063211 A1 | 3/2011 | Hoerl et al. | |
| 2011/0107269 A1 | 5/2011 | Chiu et al. | |
| 2011/0179368 A1 | 7/2011 | King et al. | |
| 2011/0294474 A1 | 12/2011 | Barany et al. | |
| 2011/0296339 A1 | 12/2011 | Kang | |
| 2011/0310100 A1 | 12/2011 | Adimatyam et al. | |
| 2012/0011200 A1 | 1/2012 | Zhang et al. | |
| 2012/0047517 A1 | 2/2012 | Townsend et al. | |
| 2012/0155510 A1 | 6/2012 | Hirsch et al. | |
| 2012/0166953 A1* | 6/2012 | Affronti | G06Q 10/101 715/730 |
| 2012/0194976 A1 | 8/2012 | Golko et al. | |
| 2012/0209630 A1 | 8/2012 | Ihm et al. | |
| 2012/0267432 A1 | 10/2012 | Kuttuva | |
| 2013/0077529 A1 | 3/2013 | Lueckenhoff et al. | |
| 2013/0080541 A1 | 3/2013 | Herbert | |
| 2013/0097239 A1 | 4/2013 | Brown et al. | |
| 2013/0159080 A1 | 6/2013 | Wu et al. | |
| 2013/0159178 A1 | 6/2013 | Colon et al. | |
| 2014/0012913 A1 | 1/2014 | Varoglu et al. | |
| 2014/0039804 A1 | 2/2014 | Park et al. | |
| 2014/0106677 A1 | 4/2014 | Altman | |
| 2015/0012617 A1 | 1/2015 | Park et al. | |

FOREIGN PATENT DOCUMENTS

| | | |
|---|---|---|
| EP | 1806649 A1 | 7/2007 |
| KR | 10-2010-0056594 A | 5/2010 |
| KR | 10-2012-0092487 A | 8/2012 |
| WO | 2007-076494 A2 | 7/2007 |
| WO | 2012-087847 A2 | 6/2012 |
| WO | WO 2014016622 | 1/2014 |
| WO | 2014151925 A1 | 9/2014 |

OTHER PUBLICATIONS

PCT International Search Report and Written Opinion dated Mar. 5, 2014 in Application No. PCT/US2013/072089.
PCT International Search Report and Written Opinion dated Jul. 4, 2014 in Application No. PCTUS2014/020624.
Sweden; Office Action dated Nov. 18, 2015 in Application Serial No. 1551071-2.
3rd party observation dated Dec. 22, 2015 against Patent Application No. 1551071-2 in Sweden.
Revault Product Data Sheet dated Mar. 19, 2015.
Kim, Young-Gon, and Moon-Seog Jun. A design of user authentication system using QR oode identifying method. Computer Sciences and Convergence Information Technology (ICCIT), 6th International Conference on IEEE. Nov. 29-Dec. 1, 2011.
Gerd Kortuem et al., 'Architectural Issues in Supporting Ad-hoc Collaboration with Wearable Computers,' In: Proceedings of the Workshop on Software Engineering for Wearable and Pervasive Computing at the 22nd International Conference on Software Engineering, 2000.
USPTO; Office Action dated Sep. 18, 2015 in U.S. Appl. No. 14/164,919.
PCT; Written Opinion dated Jul. 4, 2014 in Application No. US2014/020624.
PCT; International Preliminary Report on Patentability dated Sep. 8, 2015 in Application No. US2014/020624.
PCT; International Search Report dated Nov. 13, 2014 in US2014/047054.
PCT; Written Opinion dated Nov. 13, 2014 in US2014/047054.
PCT; International Search Report dated Jan. 6, 2015 in US2014/058126.
PCT; Written Opinion dated Jan. 6, 2015 in US2014/058126.
PCT; International Preliminary Report on Patentability dated Jun. 2, 2015 in US2013072089.
PCT; International Search Report dated Apr. 24, 2015 in US2015/012063.
PCT; Written Opinion dated Apr. 24, 2015 in US2015/012063.
PCT; International Search Report and Written Opinion dated Oct. 6, 2015 in US2015/036801.
PCT; International Search Report and Written Opinion dated Jul. 11, 2016 in US2016/021627.

* cited by examiner

SYSTEM AND METHOD FOR DISPLAYING MULTIPLE APPLICATIONS

FIELD

The present disclosure generally relates to graphical user interfaces, and more particularly to systems and methods of displaying interactive applications on a graphical user interface.

BACKGROUND

Graphical user interfaces ("GUI") provide a user with a visual display to interact with computing resources. As the complexity and speed of software applications continues to increase, it becomes more important for GUIs to provide user-friendly displays that allow users to interact with multiple programs. Existing GUIs allow users to open multiple applications at a time. However, the user must position each application on the GUI in order to create a desired layout. The user must also resize each application individually. If a user wishes to add an additional application to the display, the user must again resize the applications in order for all applications to be viewed simultaneously.

Additionally, in existing systems, the applications running on a computer system may have limited means to communicate with each other. Each application may have a specific purpose, and although one application may contain data which would be useful to another application, it may require additional software or changes to the programming of the applications for the applications to share the data, or the user may be required to manually obtain data from one application and input the data into another application.

SUMMARY

The present disclosure includes a system, method and computer program product for displaying multiple applications on a graphical user interface ("GUI"). In various embodiments, a method may include selecting a plurality of applications to be displayed in the GUI. The method may include determining a relative size for each of the plurality of applications. The method may further include formatting the GUI such that the plurality of applications substantially fills the GUI.

BRIEF DESCRIPTION OF THE DRAWINGS

A more complete understanding may be derived by referring to the detailed description and claims when considered in connection with the Figures, wherein like reference numbers refer to similar elements throughout the Figures, and:

DETAILED DESCRIPTION

Figure 1:
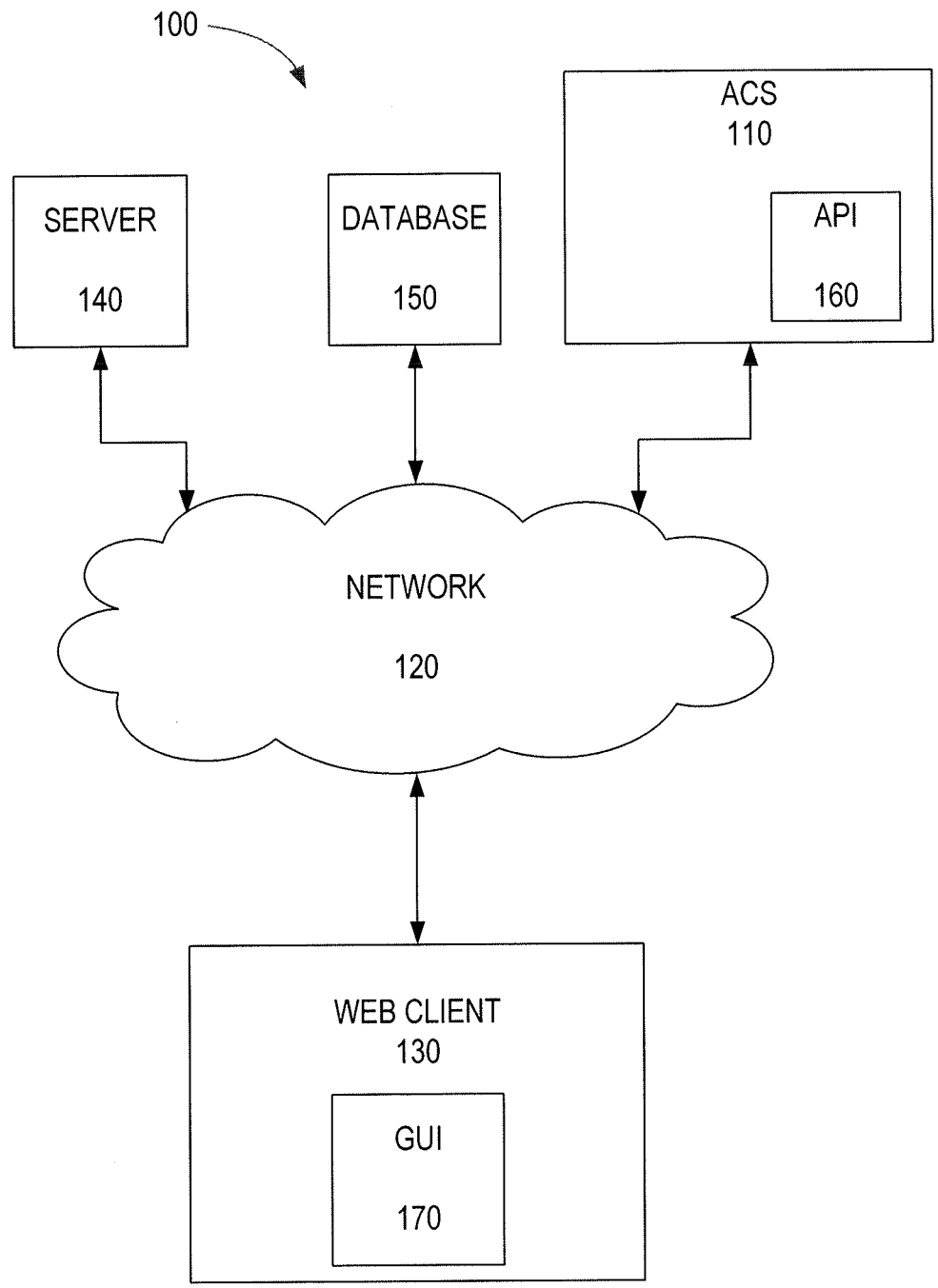
FIG. 1 illustrates a block diagram of a system for displaying multiple applications on a GUI according to various embodiments of the disclosure.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Systems, methods, and articles of manufacture for displaying a plurality of applications on a graphical user interface ("GUI") are disclosed. In various embodiments, a plurality of applications may be displayed on a GUI. In various embodiments, the applications may also be referred to as tiles. The plurality of applications may be located on the GUI such that each of the plurality of applications may be located in a portion of the GUI, and the plurality of applications may substantially cover the GUI. An application control system ("ACS") may control the relative size and location of each application. ACS may comprise default settings for each application, such that applications considered to have a relatively high level of importance appear larger on the GUI, and applications considered to have a relatively low level of importance appear smaller on the GUI. ACS may adjust the default settings in response to tracking a user's use of the various applications. ACS may adjust the size and location of the applications in response to incorporating additional applications into the GUI or removing applications from the GUI. Additionally, the user may adjust the settings to user preferences.

In various embodiments, the various applications may communicate with each other. The various applications may communicate with each other via a series of calls. In various embodiments, a first application may determine that information from a second application may be necessary in order to complete a task. The first application may transmit a request to the second application for the desired information via an application programming interface ("API"). The second application may transmit the desired information to the first application, and the first application may use the information to complete the task.

In various embodiments, API may be part of a cloud-based system. Cloud computing is discussed in further detail herein. Each application may have various permissions that permit the application to perform specific functions and obtain data from various third-party servers and databases.

Referring to FIG. 1, a system 100 for displaying a plurality of applications is illustrated according to various embodiments. System 100 may comprise an application control system ("ACS") 110, a web client 130, one or more servers 140, and one or more databases 150. ACS 110 may comprise an API 160. ACS 110 may further comprise any combination of servers and databases. The various system components may communicate via network 120. Web client 130 may comprise a graphical user interface ("GUI") 170.

In various embodiments, ACS 110 may be capable of or configured to perform all or part of a process in relation to displaying applications on a GUI 170. ACS 110 may comprise any combination of hardware and software, such as servers, databases, firewalls, computers, etc.

Network 120 may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®, cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Web client 130 may comprise any device capable of interacting with Network 120. In various embodiments, web client 130 may comprise a personal computer. However, in various embodiments web client 130 may comprise a PDA, laptop, cellular phone, GPS device, car navigation system, or any other device. Various types of web clients are described in further detail herein.

In various embodiments, ACS 110 may display a plurality of applications on a GUI 170. The plurality of applications may be any applications capable of being shown on a GUI 170. For example, in various embodiments the applications may include an Internet browser, a calendar application, a web chat application, an email application, a document viewer application, a media player application, etc. One skilled in the art will appreciate that there are an endless number of applications that may be used consistently with the present disclosure.

Figure 2:
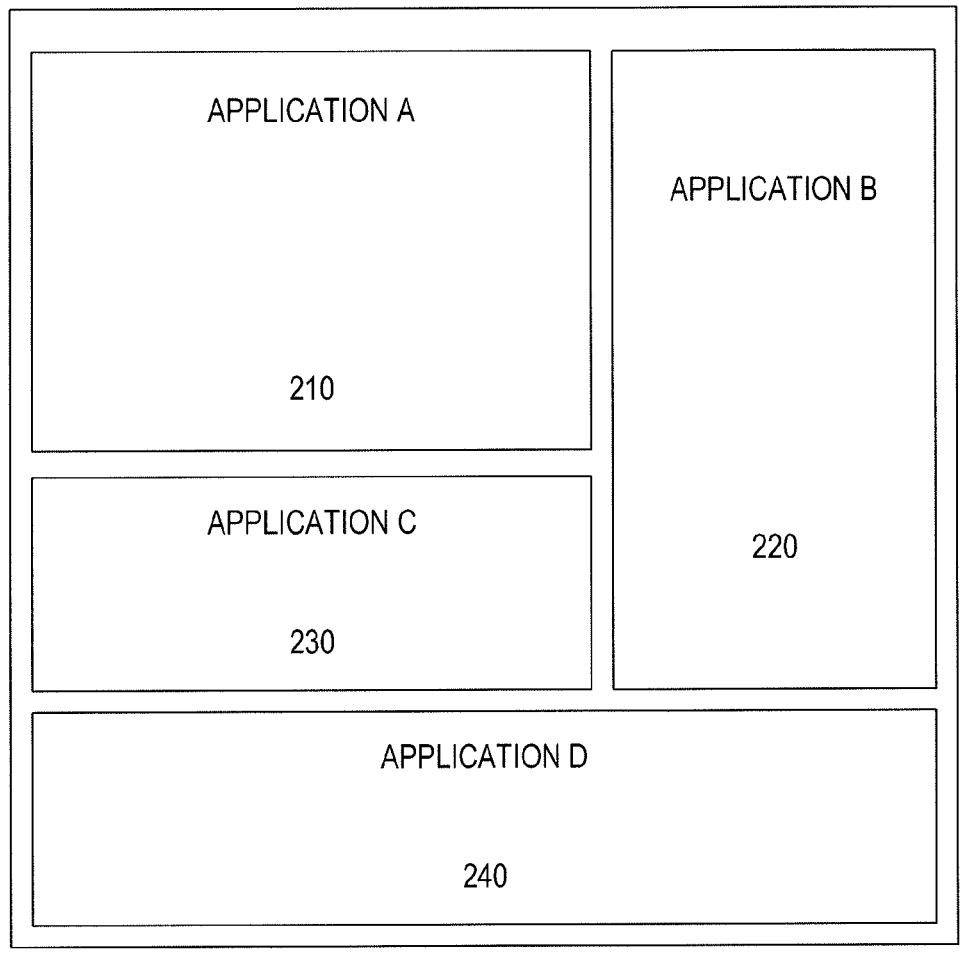
FIG. 2 illustrates an example screen of a GUI displaying four applications according to various embodiments.

Referring to FIG. 2, a GUI 200 with four applications is illustrated according to various embodiments of the disclosure. GUI 200 comprises application A 210, application B 220, application C 230, and application D 240. ACS 110 formats the layout such that the applications substantially fill a portion of GUI 200. In the illustrated embodiment, the portion of GUI 200 is substantially the entire GUI 200. However, the portion of GUI 200 may be any portion of GUI 200. ACS 110 may base the relative size of each application on a variety of factors, including but not limited to default settings, user preferences, a ranking of each application, the type and amount of data in each application, and the frequency of use of each application.

In various embodiments, ACS 110 may select a default number of applications to be displayed on GUI 170. For example, in various embodiments, ACS 110 may initially display five applications simultaneously on GUI 170. In various embodiments, ACS 110 may track the applications used most often by a user and change the default number of applications for the user. For example, if the user uses four applications on a regular basis, ACS 110 may change the default number of applications to four. If the user uses seven applications on a regular basis, ACS 110 may change the default number of applications for the user to seven. In various embodiments, the user may select a different number of applications to be displayed on GUI 170. In various embodiments, the user may save a plurality of settings for a number of applications to be displayed. For example, the user may have settings to display three, six, or ten applications. The user may switch between the saved settings in order to display the desired number of applications.

Figure 3:
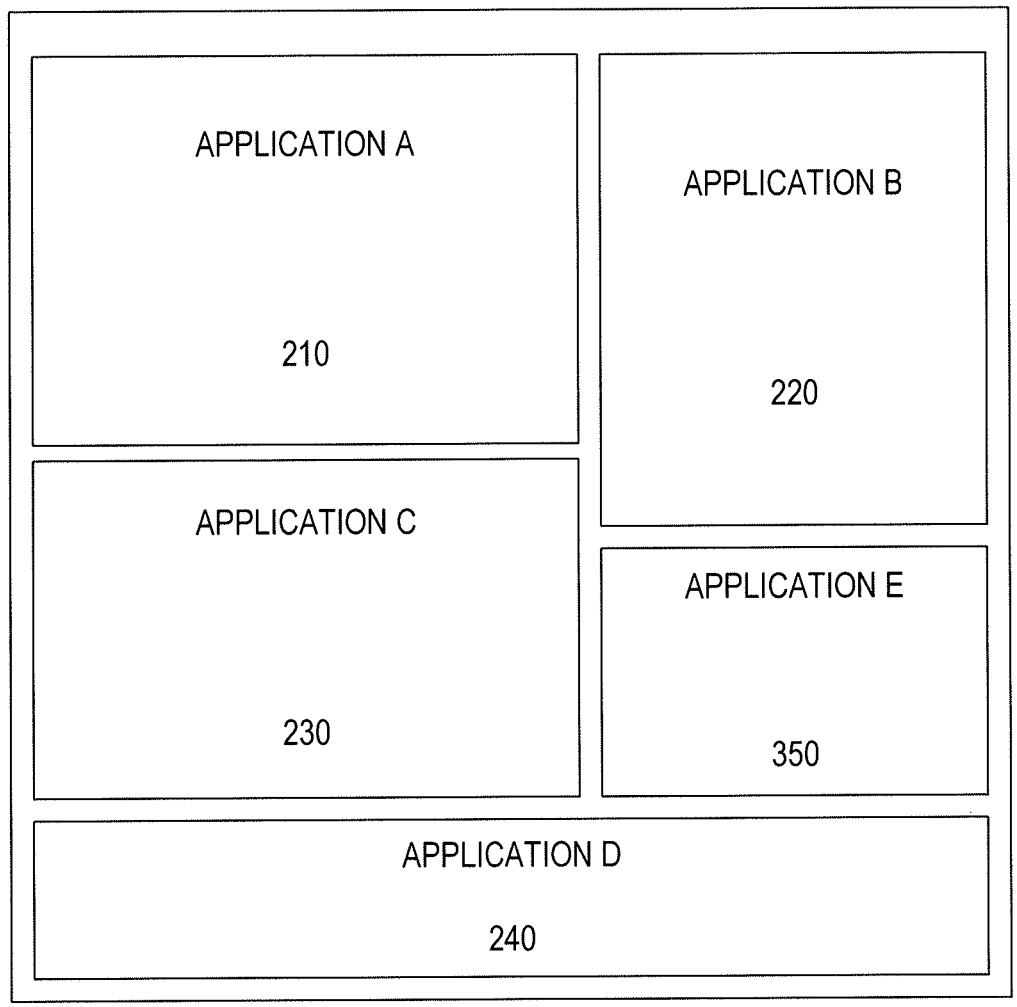
FIG. 3 illustrates an example screen of a GUI displaying five applications according to various embodiments.

Referring to FIG. 3, a GUI 300 with five applications is illustrated according to various embodiments. GUI 300 displays the four applications displayed in GUI 200, however an additional application E 350 is also displayed. The user may have added application E 350 to GUI 300, or ACS 110 may have determined that application E 350 should also be displayed. ACS 110 determines an optimal layout for the five applications such that the applications substantially fill a portion of GUI 300. ACS 110 may move or resize the previous application in order to provide an optimal layout.

In various embodiments, ACS 110 may display the applications on GUI 170 such that the applications substantially fill a portion of GUI 170. The portion may comprise any portion of GUI 170, such as substantially all of the GUI 170. ACS 110 may change the relative size and location of the applications in response to ACS 110 adding or removing applications, such that the applications substantially fill the portion of GUI 170 regardless of how many applications are displayed. The various applications may each be displayed as substantially rectangular, however the applications may comprise any shape. ACS 110 may use an algorithm to determine an optimal size and location for each application. The algorithm may determine the optimal size and location for the various applications based on at least one of the number of applications being displayed, the frequency of use of an application, the amount or type of information displayed in an application, the most recently used applications, and a user rank of an application. ACS 110 may divide GUI 170 into a grid, such that ACS 110 uses an algorithm to determine the optimal layout based on coordinates in the grid.

In various embodiments, the user may customize the size and location of the applications. The user may rank the applications, and ACS 110 may take the user ranks into account when determining an optimal layout for the applications. The user may resize an application, and ACS 110 may determine a layout incorporating the resized application. ACS 110 may change the size and/or locations of the various applications in response to the user resizing the application. In various embodiments, the user may change the location of an application by dragging the application or changing the size by any other method known in the art, and ACS 110 may determine a new layout incorporating the new location of the application. In various embodiments, the user may lock the size or location of an application, such that when ACS 110 reformats a layout of the applications, the size and/or location of the locked application does not change.

In various embodiments, ACS 110 may determine that one or more application is an active application. ACS 110 may determine that an application is an active application by determining that a user has interacted with an application within a predetermined time period. In various embodiments, ACS 110 may determine that a plurality of applications are active applications. However, in various embodiments only one application may be active at any given time. In various embodiments, a user may make an application an active application by clicking or tapping on an application, or by selecting an application by any other method known in the art.

Figure 4:
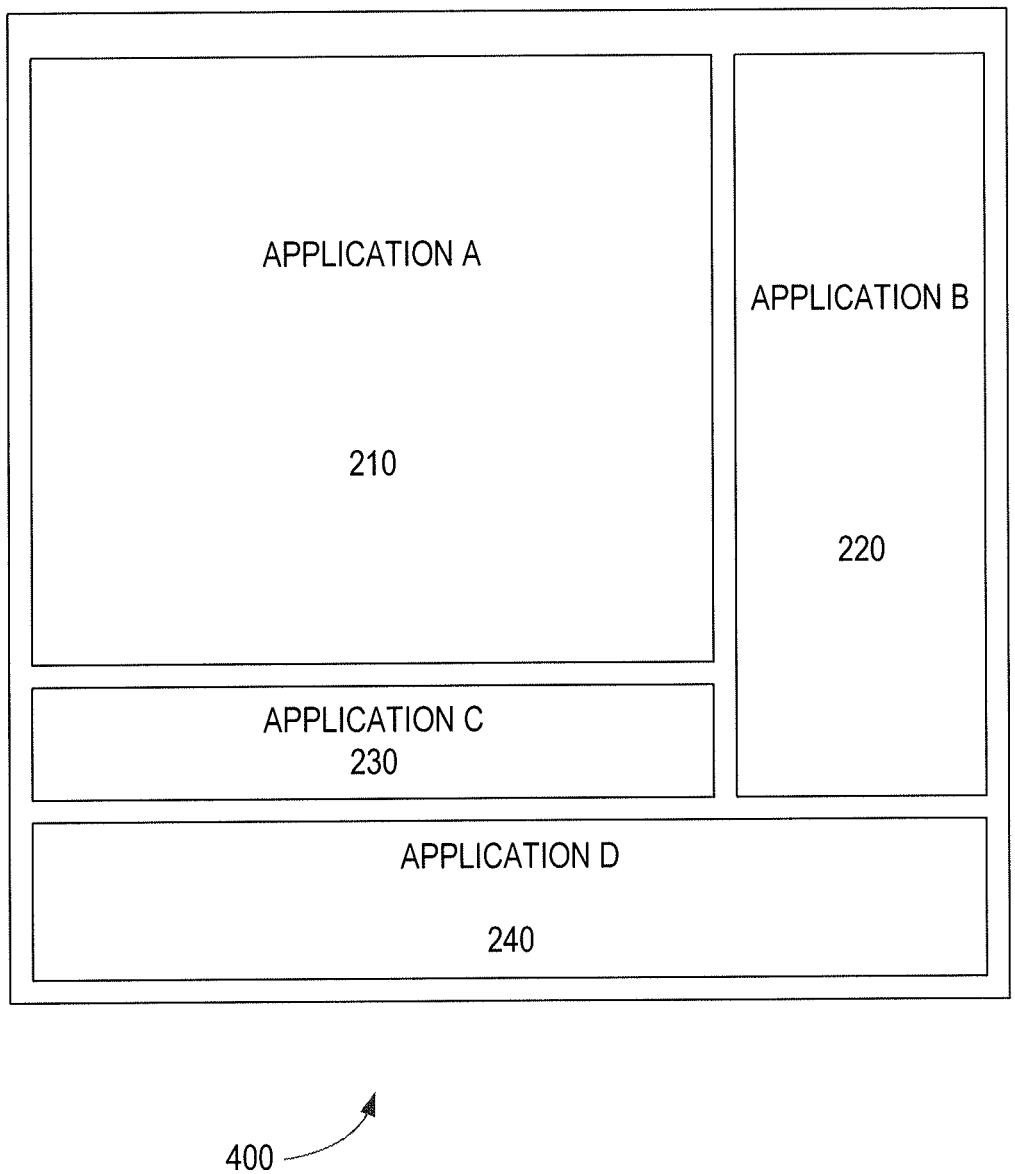
FIG. 4 illustrates an example screen of a GUI with a resized application according to various embodiments.

Referring to FIG. 4, a GUI 400 with a resized application is illustrated. Similar to GUI 200, GUI 400 comprises application A 210, application B 220, application C 230, and application D 240. However, in GUI 400, ACS 110 has determined that application A 210 should be larger. The user may have manually resized application A 210. In various embodiments, ACS 110 may have determined that application A 210 is an active application and should be larger. In response to determining that application A 210 is an active application, ACS 110 has increased the size of application A 210. ACS 110 reformats the layout by decreasing the size of the other applications such that the applications still substantially fill GUI 400.

In various embodiments, ACS 110 may determine that a first application is an active application, and ACS 110 may activate a second application in response to the first application being active. For example, ACS 110 may determine that a user typically uses the second application within a short time period after using the first application. In response to the first application being active, ACS 110 may anticipate that the user will be using the second application and ACS 110 will make the second application an active application in order to allow the user to more easily use the second application. ACS 110 may use complex algorithms to determine any number of applications to be active based on a user's prior use of the applications.

In response to an application being an active application, ACS 110 may change the display of the application. For example, ACS 110 may increase the size of the active application. In response to increasing the size of the active application, ACS 110 may reformat the layout of the non-active applications. ACS 110 may decrease the size of the non-active applications and/or remove a non-active application from the layout. In various embodiments, ACS 110 may change the brightness, opacity, or other visual properties of an active application.

In various embodiments, ACS 110 may select the applications to be displayed on GUI based on an active application. ACS 110 may determine the applications most commonly used in conjunction with an active application, and display the commonly used applications on GUI. In various embodiments, each time the user selects an application to be an active application, ACS 110 selects different applications to be displayed. The user may customize which applications should be displayed based on which applications are active.

In various embodiments, ACS 110 may determine an optimal layout for the particular web client. ACS 110 may determine a pixel size of a monitor for a personal computer, and adjust the number and relative size of applications that best fits the monitor. Additionally, ACS 110 may determine that the web client is a portable consumer device such as a smart phone or a tablet, and ACS 110 may display fewer applications on the GUI 170 in order to allow the user to more efficiently interact with a smaller display. The user may have the option to select between a limited display or a complete display for various web clients.

Figure 5:
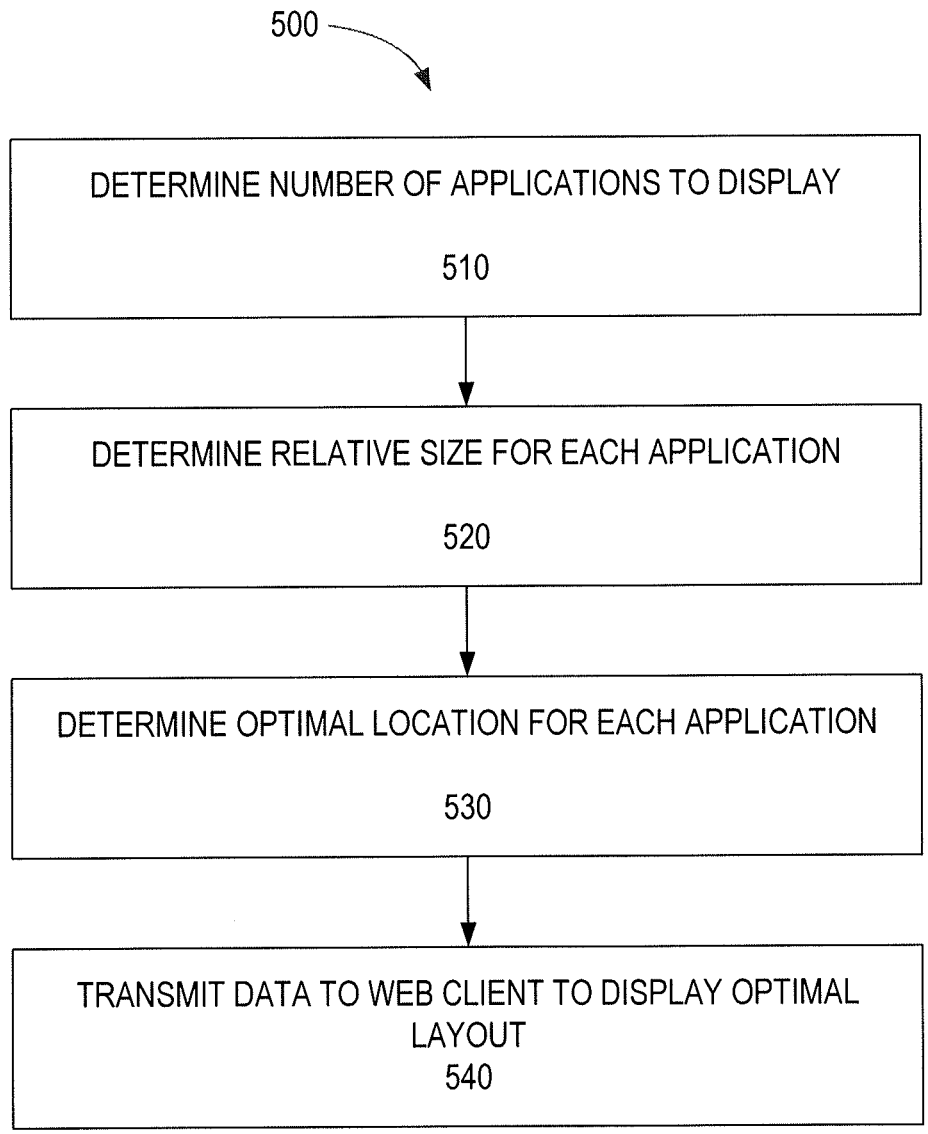
FIG. 5 illustrates a flow chart of a process for determining an optimal layout according to various embodiments.

Referring to FIG. 5, a process 500 for determining an optimal layout is illustrated according to various embodiments. ACS 110 may determine a number of applications to display (step 510). ACS 110 may determine a relative size of each application based on factors described herein (step 520). ACS 110 may determine a grid size of the GUI and determine the optimal location for each application (step 530). ACS 110 may transmit data to web client 130 to display the applications in the optimal layout (step 540).

In various embodiments, the applications may communicate with each other. Each application may be connected to a data source via network 120. A first application may determine that a second application has access to data which is desired by the first application. The first application may transmit a request to the second application for the desired information, and the second application may transmit the desired information to the first application.

Figure 6:
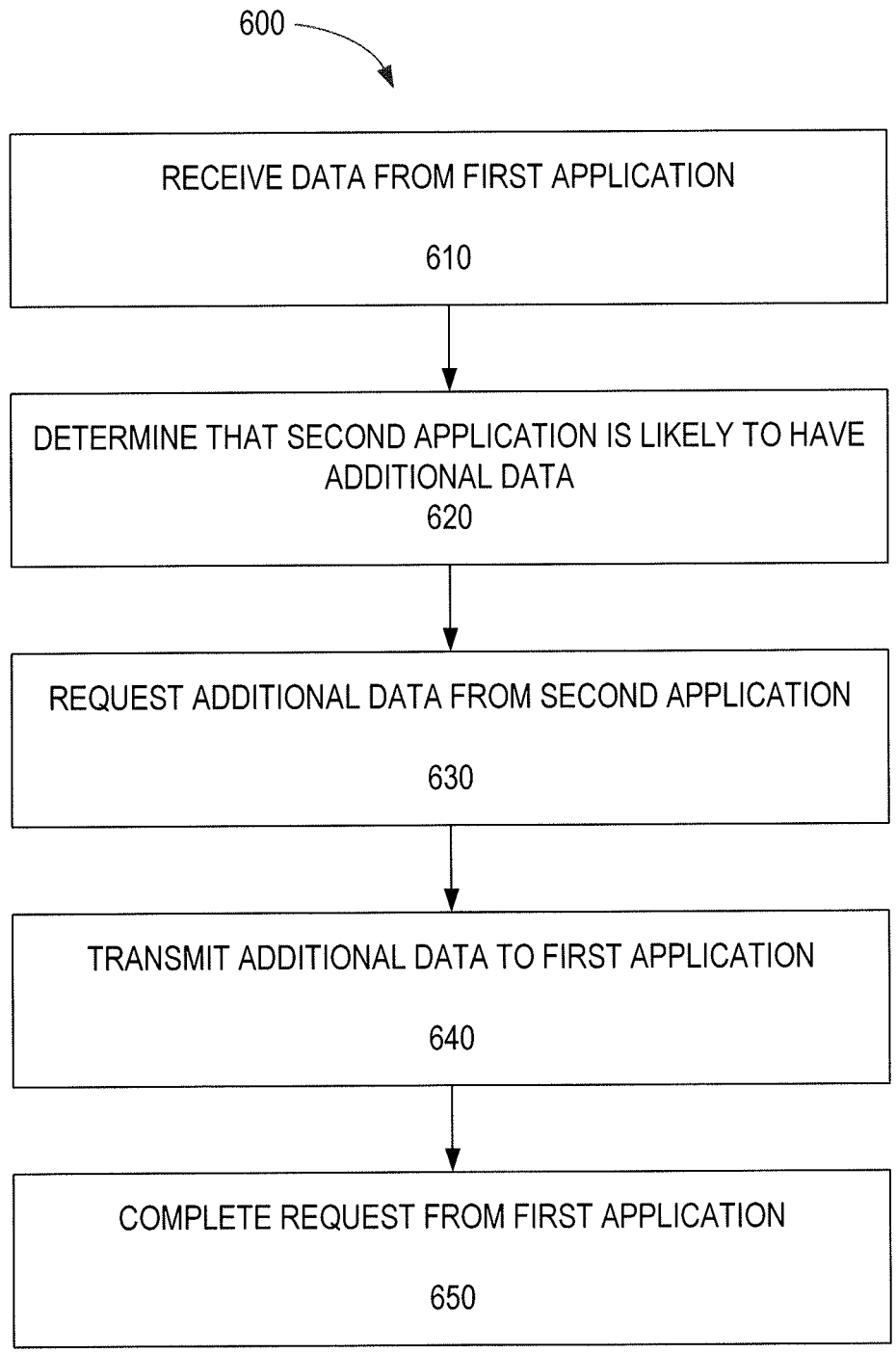
FIG. 6 illustrates a flow chart of a process for transmitting data between applications according to various embodiments.

Referring to FIG. 6, a process 600 for communicating information between applications is illustrated according to various embodiments. A user may input data into a first application, and ACS 110 may receive the data (step 610). ACS 110 may determine that additional information is necessary in order to complete a request associated with the data. ACS 110 may determine that a second application is likely to have the additional information (step 620). ACS 110 may transmit a request to the second application for the additional information (step 630). The second application may have the additional information available. In various embodiments, the second application may obtain the additional information via network 120. The second application may transmit the additional information to ACS 110, and ACS 110 may transmit the additional information to the first application (step 640). The first application may use the additional information to complete the request (step 650).

In various embodiments, ACS 110 may determine that it is more efficient for a second application to complete a request initiated in a first application. The first application may transmit the desired request to ACS 110. ACS 110 may determine that the request may be completed more efficiently by the second application. ACS 110 may transmit the request to the second application, and the second application may complete the request.

Figure 7:
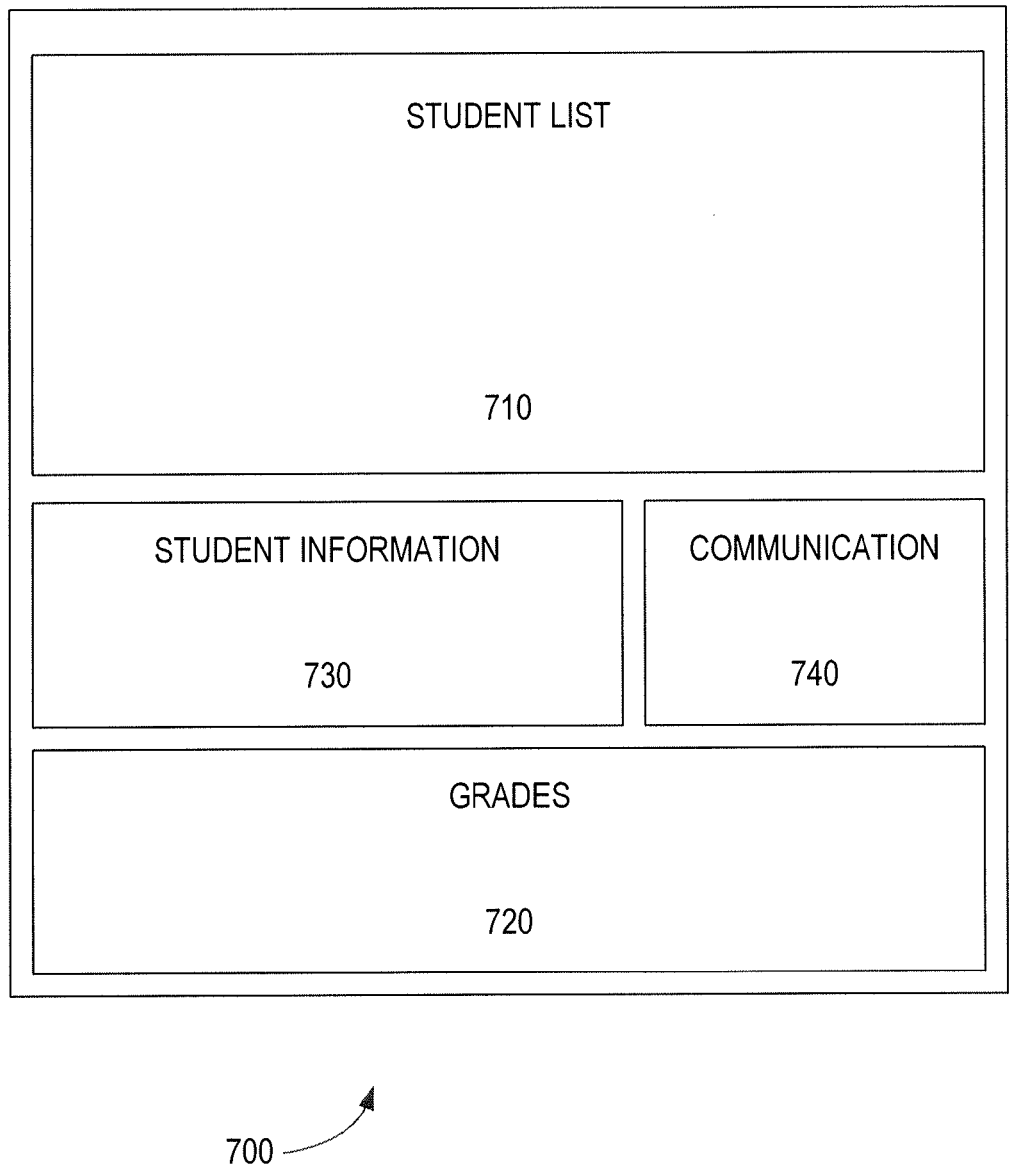
FIG. 7 illustrates an example screen of a GUI with educational applications according to various embodiments.

Referring to FIG. 7, a process for sending a communication is described with reference to an example screenshot according to various embodiments. FIG. 7 illustrates a layout 700 on a GUI which may be used by an administrator in the education setting. The layout 700 may comprise a student list application 710, a grades application 720, a student information application 730, and a communication application 740. As an example request, an administrator user may wish to send an email to the parents of a particular student. The administrator may select a student from the student list application 710. In various embodiments, at least one of the grades application 720, the student information application 730 and the communication application 740 may automatically load content relevant to the student in response to the administrator selecting the student. The student list application 710 may transmit data to API 160 indicating that a user has selected the student, and API 160 may transmit information related to the student to each application. The grades application 720 may load the student's current grades, the student information application 730 may load contact information for the student and the student's parents, and the communication application 740 may initiate a communication such as an email or phone call to the student's parents. In various embodiments, the communication application 740 may request the contact information from the student information application 730 via API 130. The administrator may enter a message into the communication application 740 and transmit the message to the student's parents.

In various embodiments, the administrator may indicate in the student list application 710 that the administrator desires to send a message to the student's parents. The administrator may type a message in the student list application 710. However, the student list application 710 may not have access to the parents' contact information or have the capability to send emails. The student list application 710 may transmit the request to the student information application 730, and the student information application 730 may associate the parents' contact information with the request, and send the request as well as the parents' contact information to the communication application 740 via API 130. The communication application 740 may transmit the message to the parents.

Although described with reference to sending a message in an educational setting, ACS 110 may be compatible in any field, including medical fields, business fields, as well as general computing which involves multiple applications. Additionally, any number of applications may communicate with each other to complete any number of tasks, and sending a message is simply one example of the many functions of ACS 110 that will be appreciated by one skilled in the art.

In various embodiments, one or more applications may display content based on the content of an active application. A user may input or receive information in a first application, and a second application may search for and/or display content related to the information in the first application. The second application may search for information based on keywords used in the first application. For example, the user may be participating in a conversation via a communication application. The user may type the word "Beethoven" as part of the conversation, and one or more applications may display content related to Beethoven, such as a video application displaying a video about Beethoven, and an internet search application displaying links to websites related to Beethoven.

In various embodiments, an application displayed on GUI may be a master application. The user may interact with the master application to control the applications displayed on GUI. In various embodiments, the user may input information in the master application, and some or all of the applications may display content associated with the information. In various embodiments, the user may initiate a task by inputting data to the master application. For example, a user may enter the phrase "send link to a study skills website to all students with a C grade in Math class." The master application may transmit the phrase to ACS 110, and ACS 110 may parse the phrase into keywords, and using language rules determine the meaning of the phrase. ACS 110 may transmit requests to various applications in order to complete the task. For example, ACS 110 may determine that the list of students in Math class may be obtained from the student list application 710, and transmit a request for the list. Using the list, ACS 110 may transmit a request to the grades application to identify the list of all students in the Math class with a C grade. ACS 110 may transmit a request to an internet search application to perform a web search for study skills websites. ACS 110 may transmit requests to the student information application 730 and the communication application 740 in order to send a link to a study skills website to the students with a C grade in Math class.

The applications may communicate with network 120 substantially in real time. The applications may download current information. The applications may share the current information with each other in order to stay up to date. Although described as applications herein, in various embodiments the applications may be part of a cloud-based system which operates independently from web client 130, and web client 130 acts as an interface between the user and the cloud-based system.

Figure 8:
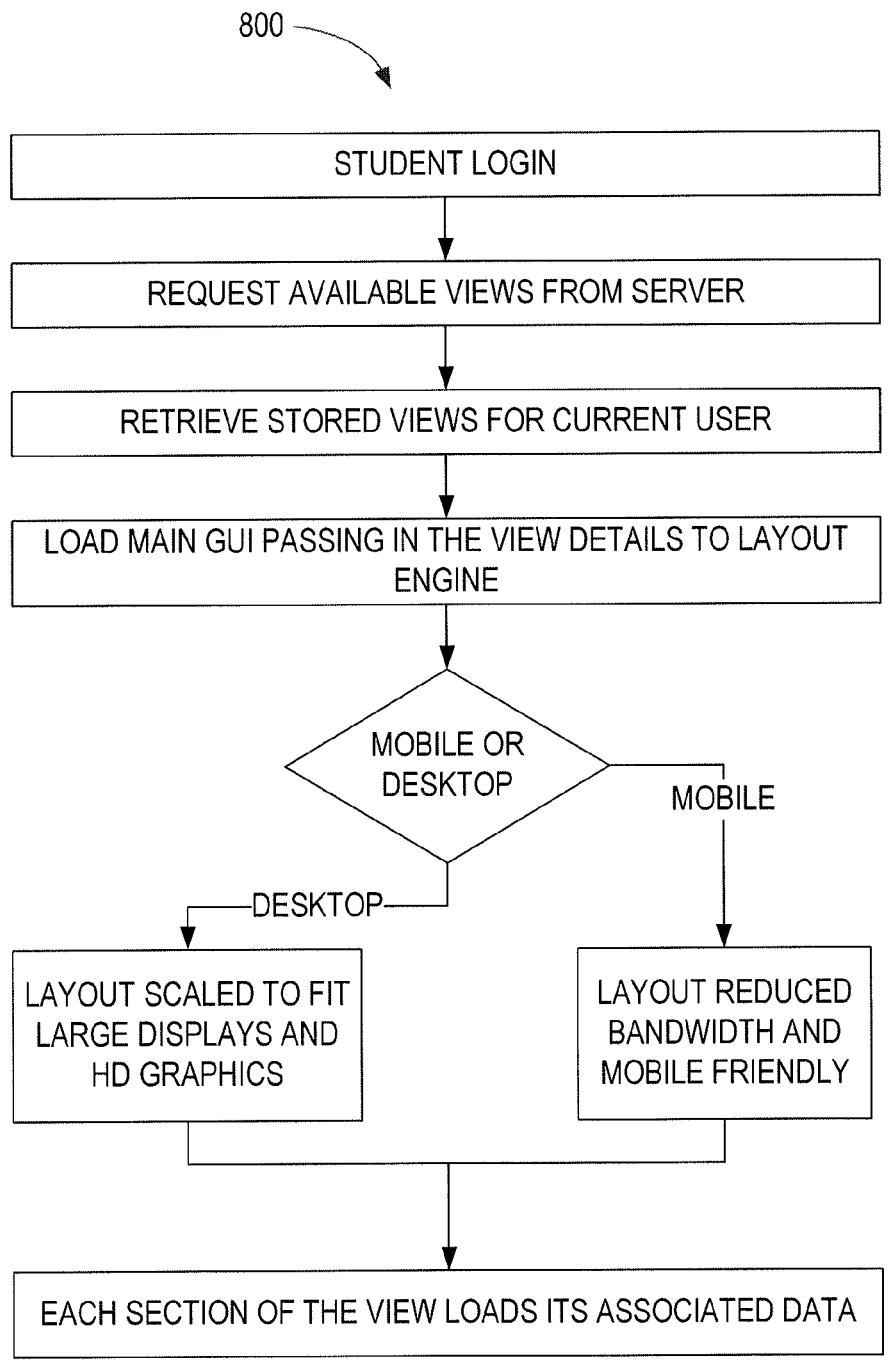
FIG. 8 illustrates a flow chart of a process for displaying a plurality of applications according to various embodiments.

Referring to FIG. 8, a process is illustrated for displaying a plurality of applications according to various embodiments. A user requests available views from a server. The server retrieves stored views for the user. ACS 110 loads the view details to a layout engine. ACS 110 determines the type of GUI (e.g. mobile or desktop). In response to the GUI being a mobile GUI, ACS 110 may reduce the bandwidth and configure the layout to be mobile friendly. In response to the GUI being a desktop, ACS 110 may scale the layout to fit large displays and high definition graphics. Each application may load its associated data.

Figure 9:
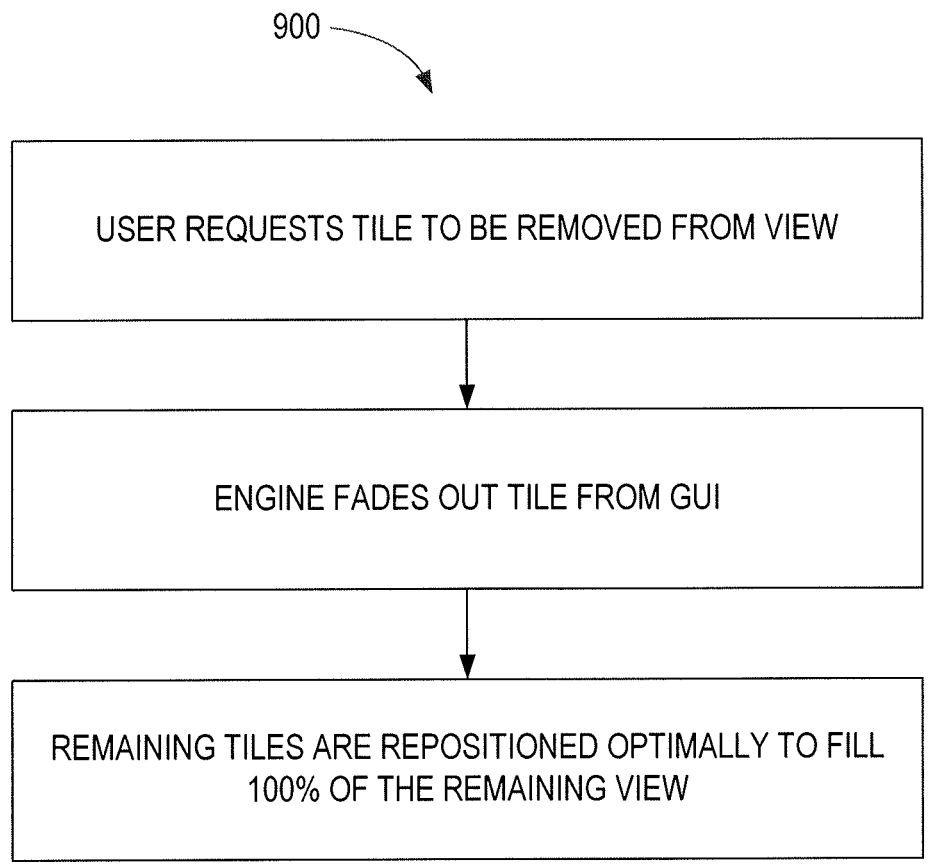
FIG. 9 illustrates a flow chart of a process for removing an application from a display according to various embodiments.

Referring to FIG. 9, a process for removing an application from a layout is illustrated according to various embodiments. A user may request an application to be removed from the GUI. ACS 110 may remove the application from the GUI. ACS 110 may reposition the remaining applications to substantially fill the GUI.

Figure 10:
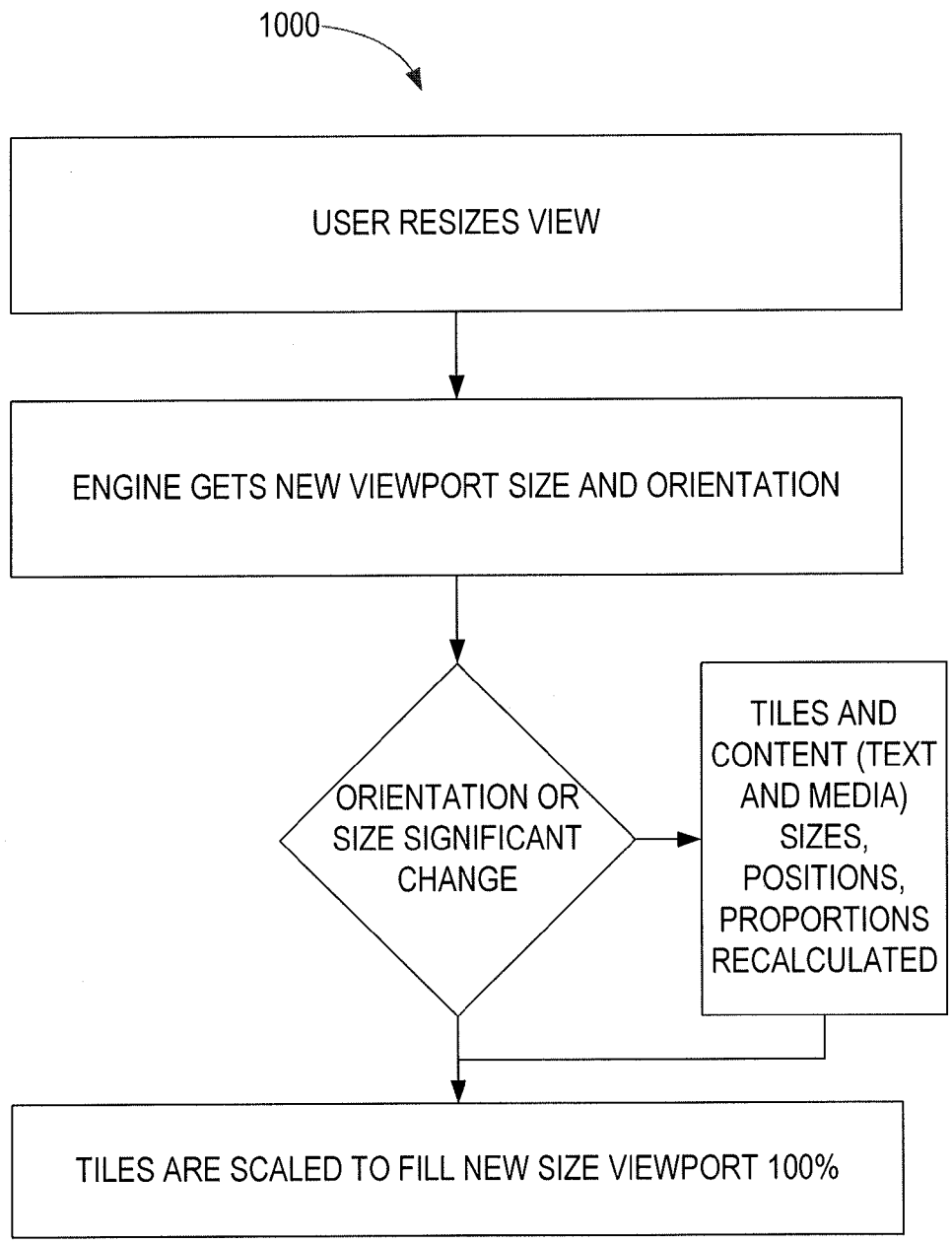
FIG. 10 illustrates a flow chart of a process for resizing a display according to various embodiments.

Referring to FIG. 10, a process for resizing a layout is illustrated according to various embodiments. A user may resize a view. ACS 110 may determine whether there is a change in orientation or a significant change in size. In response to no change in orientation or significant size change, ACS 110 may scale the applications to substantially fill the view. In response to determining that the user has changed the orientation or significantly changed the size of the view, ACS 110 may recalculate an optimal layout as further described herein.

Figure 11:
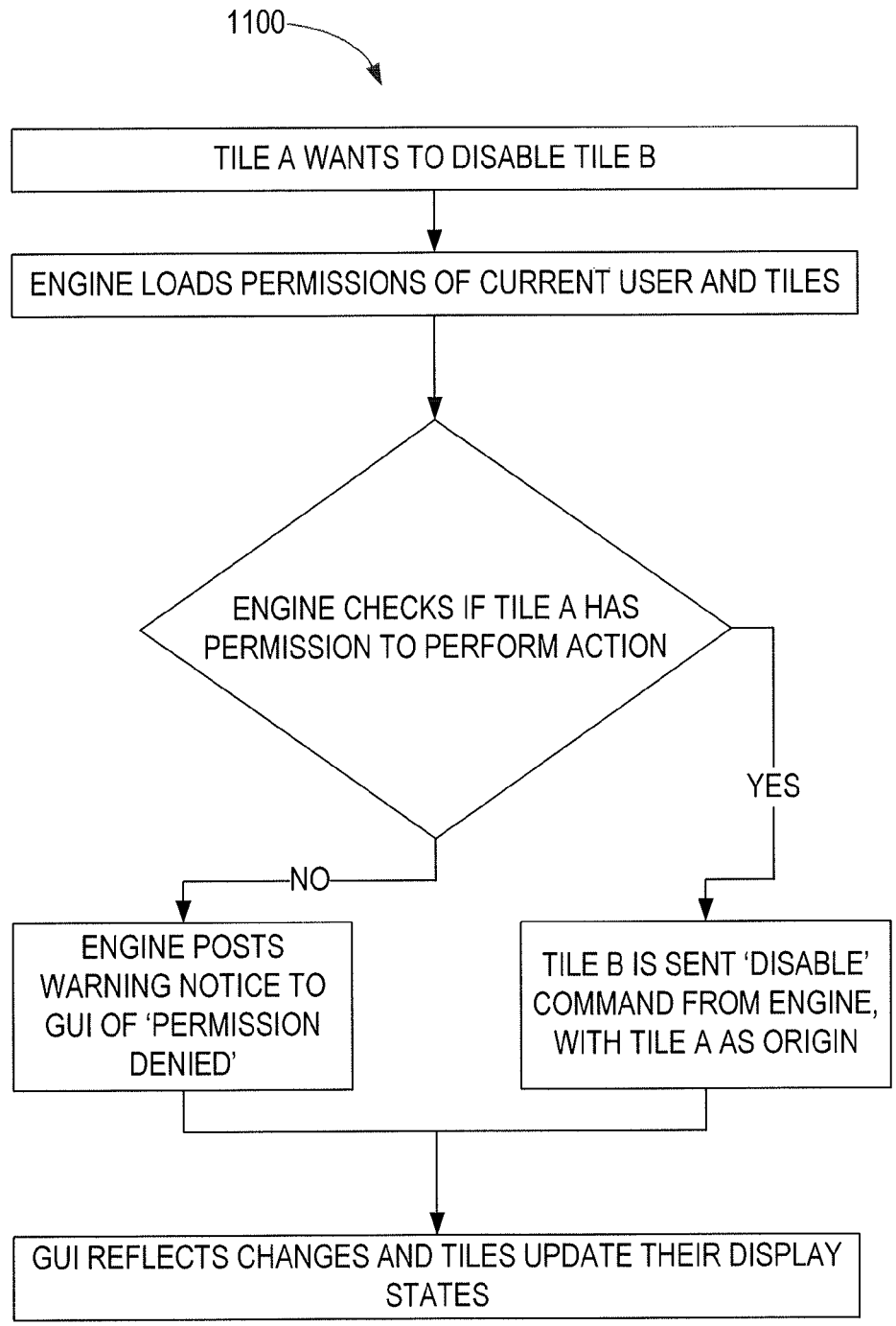
FIG. 11 illustrates a flow chart of a process for disabling an application according to various embodiments.

Referring to FIG. 11, a process for disabling an application is illustrated according to various embodiments. A first application may transmit a request to ACS 110 to disable a second application. ACS 110 may determine whether the first application has the appropriate permission to disable the second application. In response to determining that the first application does not have the appropriate permission, ACS 110 may transmit a notice to the GUI the request is denied. In response to determining that the first application has permission to disable the second application, ACS 110 may disable the second application, and update the display on the GUI.

Figure 12:
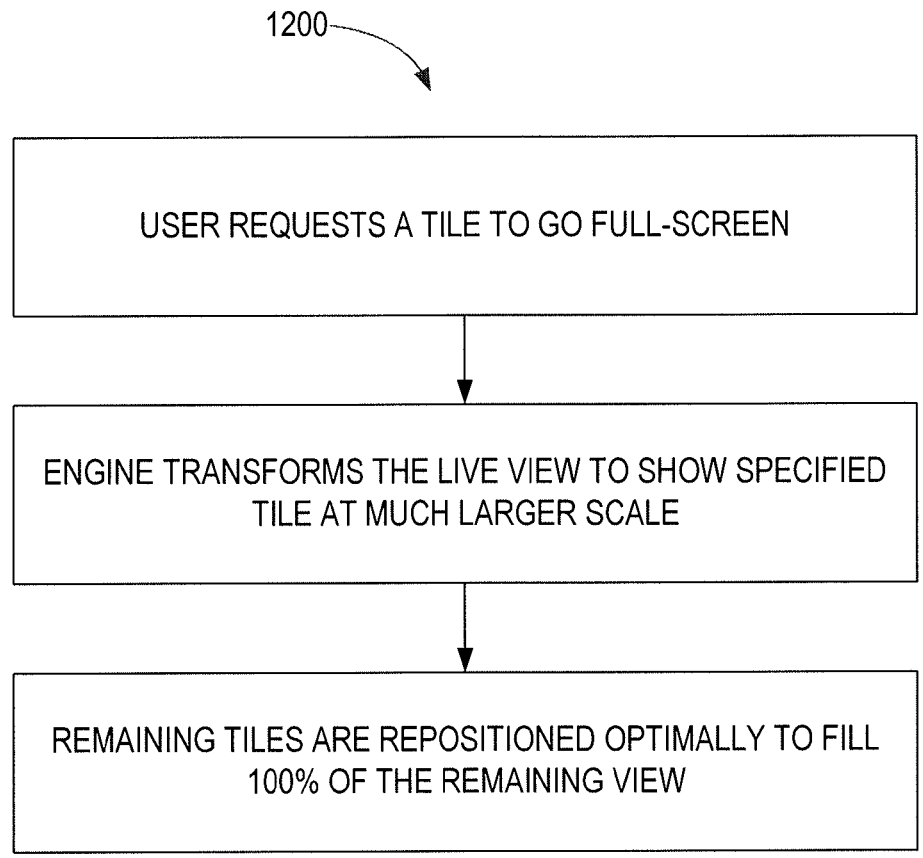
FIG. 12 illustrates a flow chart of a process for increasing the size of an application according to various embodiments.

Referring to FIG. 12, a process for increasing the size of an application is illustrated according to various embodiments. A user may request that an application be displayed in a larger mode. ACS 110 may display the application in larger mode, and ACS 110 may reposition the remaining applications to substantially fill the remaining portion of the GUI.

Figure 13:
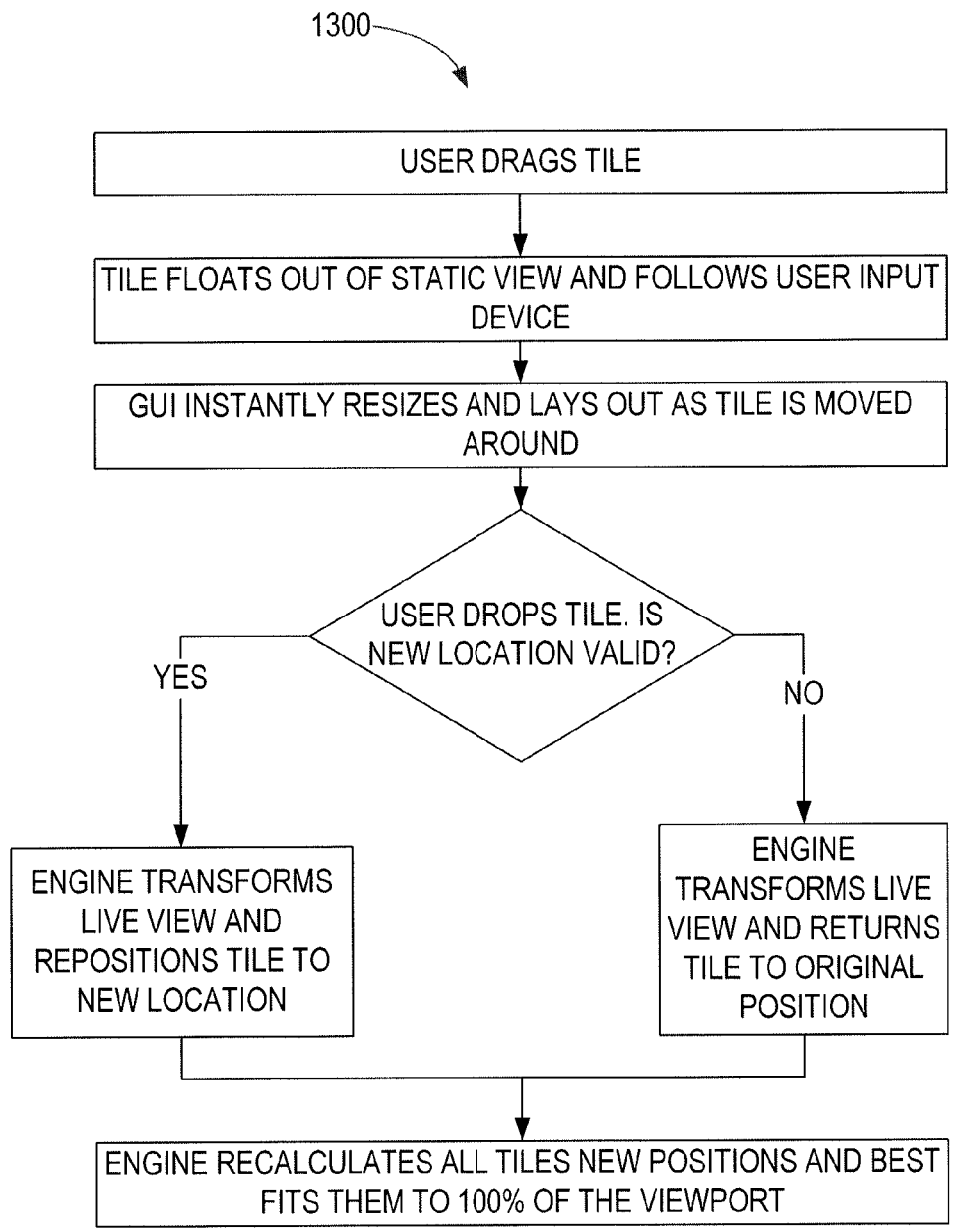
FIG. 13 illustrates a flow chart of a process for moving an application according to various embodiments.

Referring to FIG. 13, a process for moving an application is illustrated according to various embodiments. A user may drag an application or otherwise indicate a request to move the application on GUI. ACS 110 may reformat the optimal layout in real time as the user moves the application. In response to the user positioning the application in an invalid position, ACS 110 may return the display to the previous layout. In response to the user positioning the application in a valid position, ACS 110 may recalculate an optimal layout with the application in the user's desired position.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website, a uniform resource locator ("URL"), a document (e.g., a Microsoft Word document, a Microsoft Excel document, an Adobe .pdf document, etc.), an "ebook," an "emagazine," an application or microapplication (as described below), an SMS or other type of text message, an email, facebook, twitter, MMS and/or other type of communication technology. In various embodiments, a channel may be hosted or provided by a data partner. In various embodiments, the distribution channel and/or the may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client may include but is not limited to an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include but is not limited to any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in various embodiments, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in various embodiments, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of ACS to further enhance security.

Firewall may include any hardware and/or software suitably configured to protect ACS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other ACS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In various embodiments, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In various embodiments, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A computer-implemented method comprising:
    determining, by a computer-based system, a default number of applications to be displayed in a graphical user interface ("GUI");
    selecting, by the computer-based system and based on the default number of applications, a plurality of applications to be displayed in the GUI;
    determining, by the computer-based system, a relative size for each of the plurality of applications;
    formatting, by the computer-based system, the GUI such that the plurality of applications fills the GUI;
    activating, by the computer-based system and based on input from a user, a first application in the plurality of applications;
    resizing, by the computer-based system, the first application;
    activating, by the computer-based system and in response to the activating the first application, a second application in the plurality of applications;
    resizing, by the computer-based system, the second application such that the plurality of applications fills the GUI;
    removing, by the computer-based system and in response to the activating the second application, a non-active application from the plurality of applications displayed in the GUI;
    receiving, by the computer-based system and via the first application, input comprising a first task;
    parsing, by the computer-based system, the input into keywords;
    determining, by the computer-based system, that the second application contains data that may be obtained in order to complete the first task;
    transmitting, by the computer-based system and based on the keywords, a request to the second application; and
    transmitting, by the computer-based system, the data from the second application to the first application via an application programming interface.

2. The method of claim 1, further comprising adding, by the computer-based system, a subsequent application to the plurality of applications.

3. The method of claim 2, further comprising incorporating, by the computer-based system, the subsequent application to the GUI, wherein the incorporating the subsequent application to the GUI comprises resizing the plurality of applications, such that the plurality of applications and the subsequent application fill the GUI.

4. The method of claim 1, wherein the relative size for each of the plurality of applications is based on at least one of a frequency of use of the plurality of applications, and a user rank of the plurality of applications.

5. The method of claim 1, further comprising resizing, by the computer-based system, the first application in the plurality of applications based on user input.

6. The method of claim 1, further comprising:
    locking, by the computer-based system and based on first user input, a size of the first application in the plurality of applications;
    resizing, by the computer-based system and based on second user input, the second application in the plurality of applications; and
    resizing, by the computer-based system and in response to the second user input, remaining applications in the plurality of applications such that the plurality of applications fills the GUI, wherein the size of the first application remains constant.

7. The method of claim 1, further comprising increasing, by the computer-based system and in response to the activating the first application, a size of the first application.

8. The method of claim 1, wherein the plurality of applications are selected based on an active application.

9. The method of claim 1, further comprising receiving, by the computer-based system and via the first application in the plurality of applications, a request.

10. The method of claim 1, further comprising receiving, by the computer-based system, first data in the first application in the plurality of applications, and loading, by the computer-based system, second data in the second application in the plurality of applications, wherein the second data is relevant to the first data.

11. The method of claim 1, further comprising:
    receiving, by the computer-based system, a selection of a student in a student list application in the plurality of applications;
    loading, by the computer-based system, content relative to the student in a grades application in the plurality of applications and a communication application in the plurality of applications;
    transmitting, by the computer-based system and based on information in the grades application, a message to the student via the communication application.

12. A system comprising:
a processor for displaying applications in a graphical user interface ("GUI"),
a tangible, non-transitory memory configured to communicate with the processor,
the tangible, non-transitory memory having instructions stored thereon that, in response to execution by the processor, cause the processor to perform operations comprising:
determining, by the processor, a default number of applications to be displayed in the GUI;
selecting, by the processor and based on the default number of applications, a plurality of applications to be displayed in the GUI;
determining, by the processor, a relative size for each of the plurality of applications;
formatting, by the processor, the GUI such that the plurality of applications fills the GUI;
activating, by the processor and based on input from a user, a first application in the plurality of applications;
resizing, by the processor, the first application;
activating, by the processor and in response to the activating the first application, a second application in the plurality of applications;
resizing, by the processor, the second application such that the plurality of applications fills the GUI;
removing, by the processor and in response to the activating the second application, a non-active application from the plurality of applications displayed in the GUI;
receiving, by the processor and via the first application, input comprising a first task;
parsing, by the processor, the input into keywords;
determining, by the processor, that the second application contains data that may be obtained in order to complete the first task;
transmitting, by the processor and based on the keywords, a request to the second application; and
transmitting, by the processor, the data from the second application to the first application via an application programming interface.

13. An article of manufacture including a tangible, non-transitory computer-readable storage medium having computer-executable instructions stored thereon that, in response to execution by a computer-based system for displaying applications in a graphical user interface ("GUI"), cause the computer-based system to perform operations comprising:
determining, by the computer-based system, a default number of applications to be displayed in the GUI;
selecting, by the computer-based system and based on the default number of applications, a plurality of applications to be displayed in the GUI;
determining, by the computer-based system, a relative size for each of the plurality of applications;
formatting, by the computer-based system, the GUI such that the plurality of applications fills the GUI;
activating, by the computer-based system and based on input from a user, a first application in the plurality of applications;
resizing, by the computer-based system, the first application; activating, by the computer-based system and in response to the activating the first application, a second application in the plurality of applications;
resizing, by the computer-based system, the second application such that the plurality of applications fills the GUI;
removing, by the computer-based system and in response to the activating the second application, a non-active application from the plurality of applications displayed in the GUI;
receiving, by the computer-based system and via the first application, input comprising a first task;
parsing, by the computer-based system, the input into keywords;
determining, by the computer-based system, that the second application contains data that may be obtained in order to complete the first task;
transmitting, by the computer-based system and based on the keywords, a request to the second application; and
transmitting, by the computer-based system, the data from the second application to the first application via an application programming interface.

* * * * *